(12) United States Patent
Kochan et al.

(10) Patent No.: US 9,430,527 B2
(45) Date of Patent: Aug. 30, 2016

(54) KEYWORD-BASED CONTENT MANAGEMENT

(75) Inventors: Linh Phuong Dinh Kochan, Newport Coast, CA (US); Tan Quang Bui, Aliso Viejo, CA (US); Hong Quang Bui, Laguna Niguel, CA (US); Chris Halim, San Jose, CA (US)

(73) Assignee: UNICOM Systems, Inc., Mission Hills, CA (US)

( * ) Notice: Subject to any disclaimer, the term of this patent is extended or adjusted under 35 U.S.C. 154(b) by 111 days.

(21) Appl. No.: 12/102,630

(22) Filed: Apr. 14, 2008

(65) Prior Publication Data

US 2008/0256101 A1    Oct. 16, 2008

Related U.S. Application Data (60) Provisional application No. 60/911,454, filed on Apr. 12, 2007.

(51) Int. Cl.
*G06F 17/30* (2006.01)

(52) U.S. Cl.
CPC .... *G06F 17/30477* (2013.01); *G06F 17/30997* (2013.01)

(58) Field of Classification Search
None
See application file for complete search history.

(56) References Cited

U.S. PATENT DOCUMENTS

| | | | |
|---|---|---|---|
| 7,024,403 B2 | 4/2006 | Kyler | |
| 2003/0225696 A1* | 12/2003 | Niwa | 705/50 |
| 2007/0051793 A1* | 3/2007 | Katoh et al. | 235/375 |
| 2007/0208699 A1* | 9/2007 | Uetabira et al. | 707/3 |

* cited by examiner

*Primary Examiner* — Bai D. Vu
(74) *Attorney, Agent, or Firm* — IPR Law Group, PC (57) ABSTRACT

A method, implementable in a system coupled to a network, includes accessing a first portion of a memory device coupled to the network. The first portion has stored thereon information characterizing an entity. An information set of a predetermined information type is gathered from the first portion. First and second information subsets of the information set are organized into first and second keywords. A second portion of a memory device coupled to the network is accessed. The second portion has stored thereon a plurality of data sets. First and second subsets of the data sets are identified. Each data set of the first data-set subset includes the first keyword, and each data set of the second data-set subset includes the second keyword. The first data-set subset is stored in a third portion of a memory device coupled to the network.

16 Claims, 6 Drawing Sheets

| Name | First Name | Last Name | Middle Name | Nickname | Username 1 | Username 2 | E-mail Address 1 |
|---|---|---|---|---|---|---|---|
| Jane Smith | Jane | Smith | Mary | | janesmith | | janesmith@gmail.com |
| Bob Johnson | Bob | Johnson | | Robert Johnson | bob | bobj | bob@yahoo.com |
| Memeo | | | | Memeo, Inc. | memeo | | info@memeo.com |

| E-mail Address 2 | E-mail Address 3 | E-mail Address 4 | Birthday | Anniversary | Home Street | Home City | Home Postal Code |
|---|---|---|---|---|---|---|---|
| | janesmith@gmail.com | | 1/2/1980 | | 12 First Street | Los Angeles | 90012 |
| bobjohnson@abc.net | bobj@yahoo.com | bobjohnson@abc.net | | 3/1/2003 | 55 A Road | Santa Ana | 92705 |
| supdev@memeo.com | supdev@memeo.com | jobs@memeo.com | | | | | |

| Home State | Home Country/Region | Home Phone | Home Fax | Mobile Phone | Personal Web Page | Business Street | Business City |
|---|---|---|---|---|---|---|---|
| CA | USA | | | 213-549-9000 | | 1234 Business Rd. | Business Town |
| CA | USA | 714-555-1555 | | | http://www.bobjohnson.com | 120 Varies, Suite 520 | Aliso Viejo |

| Business Postal Code | Business State | Business Country/Region | Business Web Page | Business Phone | Business Fax | Pager | Company |
|---|---|---|---|---|---|---|---|
| 12345 | CA | USA | http://www.abc.net | 949-333-3333 | 949-333-3332 | | ABCNet, Inc. |
| 92656 | CA | USA | http://www.memeo.com | 949-2319-4745 | 949-209-8241 | | |

| Job Title | Department | Office Location | Notes | Custom Field 1 | Custom Field 2 | Custom Field 3 | Custom Field 4 |
|---|---|---|---|---|---|---|---|
| Software Engineer | | | | Hong Bui | Steve Owens | AutoBackup | AutoSync |

KEYWORD-BASED CONTENT MANAGEMENT

CROSS-REFERENCE TO RELATED APPLICATIONS

This application claims priority to U.S. Provisional Appl. No. 60/911,454 entitled "USING KEYWORDS TO MANAGE CONTENTS" and filed Apr. 12, 2007, which is hereby incorporated by reference in its entirety.

FIELD OF THE INVENTION

This invention relates generally to computer-implemented processes and, more specifically, to content management in electronic devices.

BACKGROUND OF THE INVENTION

As computers become an increasingly ubiquitous tool, people are creating and storing more and more different kinds of data on their hard disks. Tax returns, financial records, letters, address books, photos, and digital music all have varying levels of sentimental, financial, and utilitarian value. However, traditional backup programs treat all of these files in the same manner, regardless of sensitivity and/or value to the user.

Existing backup software typically requires the user's periodic interaction, usually to insert a new disc or tape or to initiate a network connection. Because this interaction is not initiated by the user and offers no immediate perceived value, it is often an unwanted chore. As such, existing data backup systems do not adequately help users protect themselves from data loss because they treat all data the same, thereby preventing the user from being able to treat data with different levels of care. Additionally, locating and assessing a desired storage destination for varying file types can likewise be a tedious and unwanted chore.

Other problems with the prior art not described above can also be overcome using the teachings of embodiments of the present invention, as would be readily apparent to one of ordinary skill in the art after reading this disclosure.

SUMMARY OF THE INVENTION

In an embodiment, a method, implementable in a system coupled to a network, includes accessing a first portion of a memory device coupled to the network. The first portion has stored thereon information characterizing an entity. An information set of a predetermined information type is gathered from the first portion. First and second information subsets of the information set are organized into first and second keywords. A second portion of a memory device coupled to the network is accessed. The second portion has stored thereon a plurality of data sets. First and second subsets of the data sets are identified. Each data set of the first data-set subset includes the first keyword, and each data set of the second data-set subset includes the second keyword. The first data-set subset is stored in a third portion of a memory device coupled to the network, and the second data-set subset is stored in a fourth portion of a memory device coupled to the network.

BRIEF DESCRIPTION OF THE DRAWING

Preferred and alternative embodiments of the present invention are described in detail below with reference to the following drawings.

DETAILED DESCRIPTION OF THE PREFERRED EMBODIMENT

Figure 1:
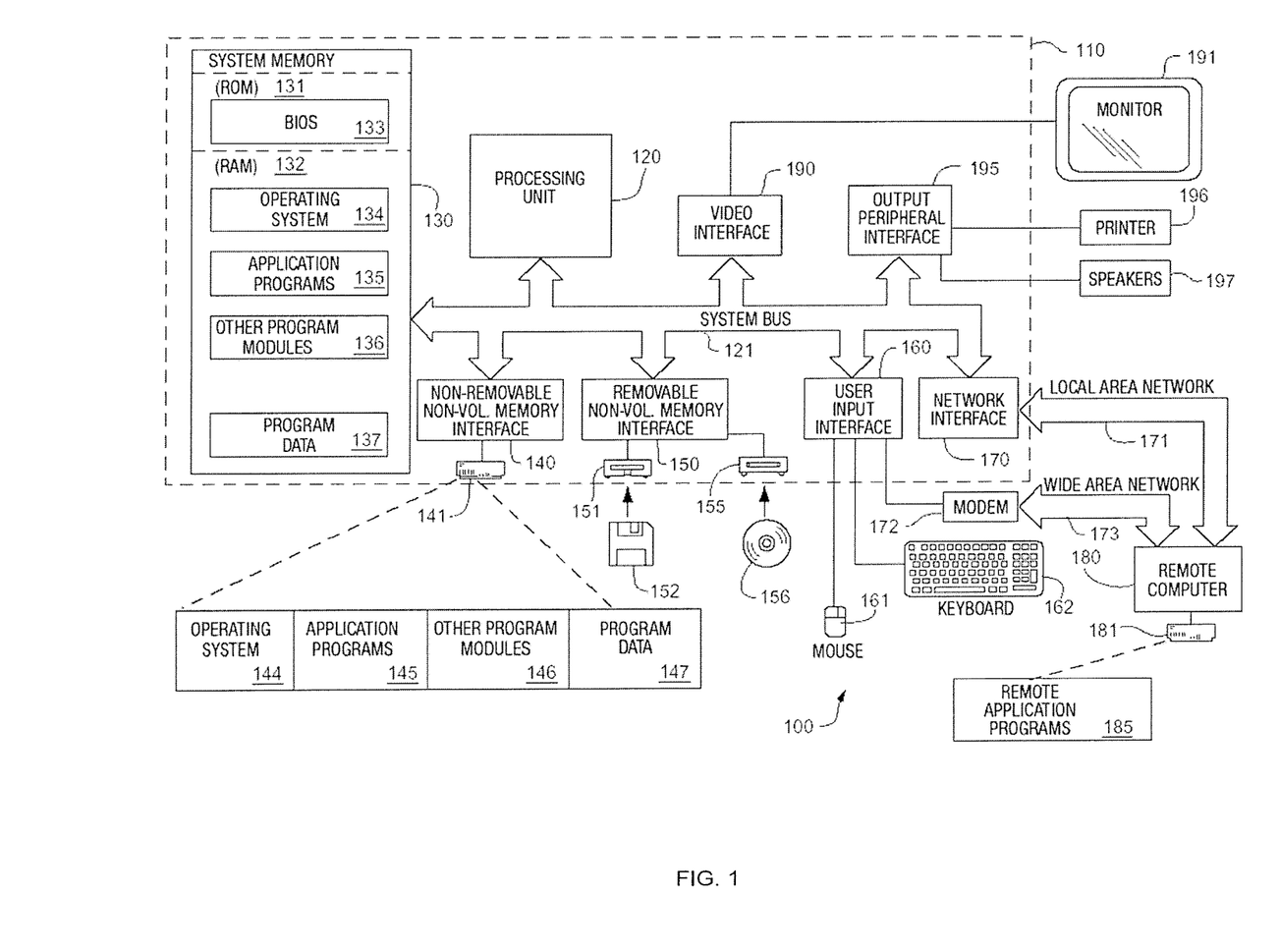
FIG. 1 is a schematic view of an exemplary operating environment in which an embodiment of the invention can be implemented.

FIG. 1 illustrates an example of a suitable computing system environment 100 on which an embodiment of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

Embodiments of the invention are operational with numerous other general purpose or special purpose computing systems environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Embodiments of the invention may be described in the general context of computer-executable instructions, such as program modules, being executed by a computer and/or by computer-readable media on which such instructions or modules can be stored. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
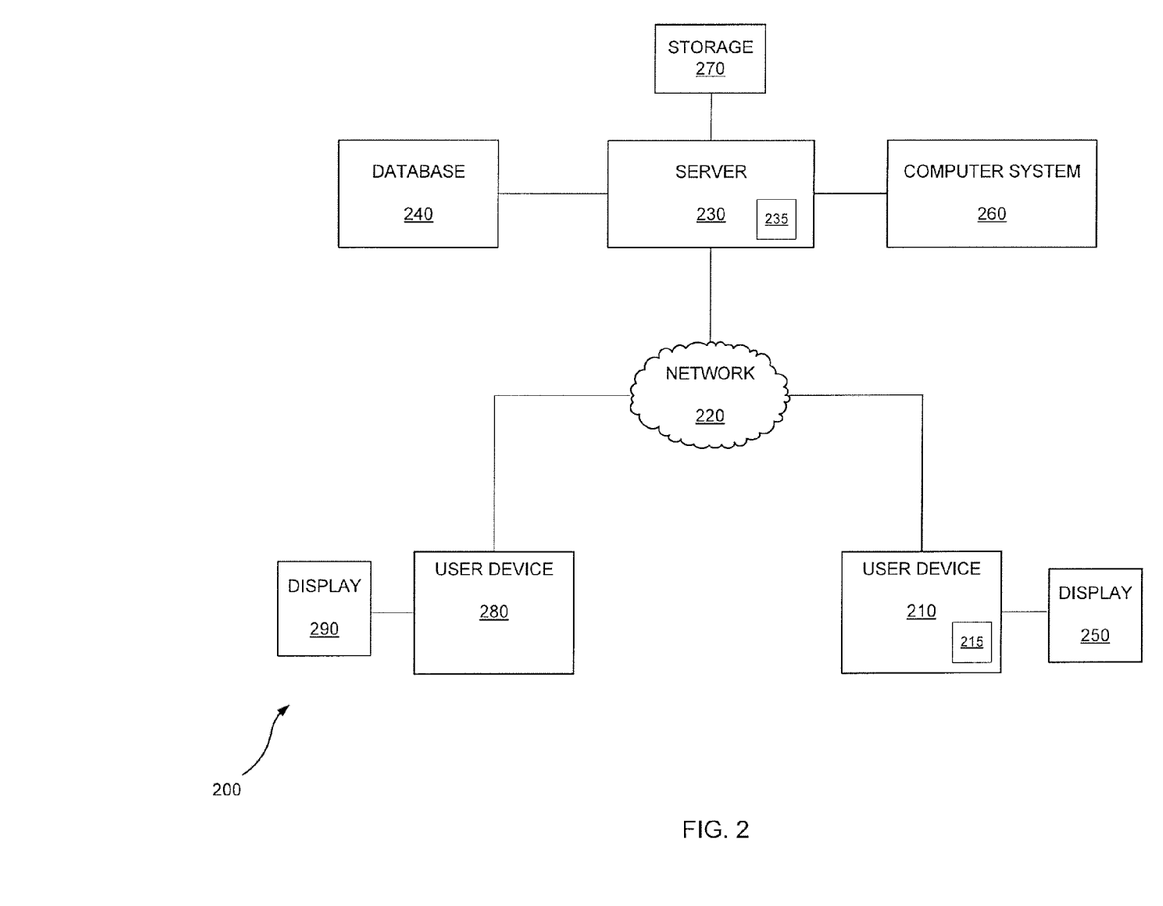
FIG. 2 is a functional block diagram of an exemplary operating environment in which an embodiment of the invention can be implemented.

Referring now to FIG. 2, an embodiment of the present invention can be described in the context of an exemplary computer network system 200 as illustrated. System 200 includes electronic user devices 210, 280, such as personal computers, workstations or other processing devices (e.g., personal digital assistants), that are linked via a communication medium, such as a network 220 (e.g., the Internet), to an electronic device or system, such as a server 230. The server 230 may further be coupled, or otherwise have access, to a database 240, electronic storage 270 and a computer system 260. Although the embodiment illustrated in FIG. 2 includes one server 230 coupled to two user devices 210, 280 via the network 220, it should be recognized that embodiments of the invention may be implemented using two or more such user devices coupled to one or more such servers.

In an embodiment, each of the user devices 210, 280 and server 230 may include all or fewer than all of the features associated with the computer 110 illustrated in and discussed with reference to FIG. 1. User devices 210, 280 may include or may be otherwise coupled to a computer screen or display 250, 290, respectively. User devices 210, 280 can be used for various purposes including both network- and local-computing processes.

The user devices 210, 280 are linked via the network 220 to server 230 so that computer programs, such as, for example, a browser or other applications, running on the user devices 210, 280 can cooperate in two-way communication with server 230. Server 230 may be coupled to database 240 and/or electronic storage 270 to retrieve information therefrom and to store information thereto. Additionally, the server 230 may be coupled to the computer system 260 in a manner allowing the server to delegate certain processing functions to the computer system.

Embodiments of the invention gather all or some information related to a particular person/entity and store it in a central location.

Embodiments of the invention may include software applications, executable by one or more of the user devices 210, 280 and server 230, that utilize gathered personal information to perform backup, synching, sharing, and/or management of data that contain one or more keyword(s) that pertain(s) to a person or an entity. Embodiments of the invention manage and/or organize all or some digital content stored at different locations by using keywords associated with a person/entity's personal information.

Embodiments of the invention automatically gather all or some information related to a person/entity (by accessing other databases or applications such as email applications, web browsers, etc.). As used herein, a process that is performed "automatically" may mean that the process is performed as a result of machine-executed instructions and does not, other than the establishment of user preferences, require manual effort. Examples of personal information include contact information (name, nicknames, email/web addresses, home/business addresses, phone numbers, etc.), important dates (birthday, anniversary, events, etc.), and other information that may be used in particular contexts (social security number, credit card numbers, login username, etc.). Customized personal information can also be created through a GUI application. All or some of this information may be then stored in a central location and/or serves as keywords that relate to this particular person/entity.

Embodiments of the invention manage data by searching for contents with any of the keywords related to a person and/or organizing/saving the matching data for that person/entity Embodiments of the invention do not require the managed data (folders, files, images, etc.) to be at a certain location or in a certain format.

Currently, different personal information gets stored in different places by different applications (Contact info in Outlook Contacts, important dates in Calendar, login, credit card info in web browsers, etc.). Embodiments of the invention allow all or some personal information to be stored in one place for a person/entity.

The gathered information can be used as keywords by other different applications to perform operations such as backup, synching, sharing, and/or management of all or some digital contents stored at different locations For example, a user of the user device 210 may instruct an application 215 executed by the user device 210 to access a memory portion of the user device 280 and, as discussed in greater detail below, gather therefrom personal information associated with, or other information pertaining to activities of, the user. Alternatively, the user of the user device 210 may instruct an application 215 executed by the user device 210 to access a memory portion of the user device 210 and gather therefrom personal information associated with, or other information pertaining to activities of, the user. Still alternatively, the user may instruct a web-based application 235 executed by the server 230 to perform one or more of the information-accessing and -gathering functions described above.

Figure 3:
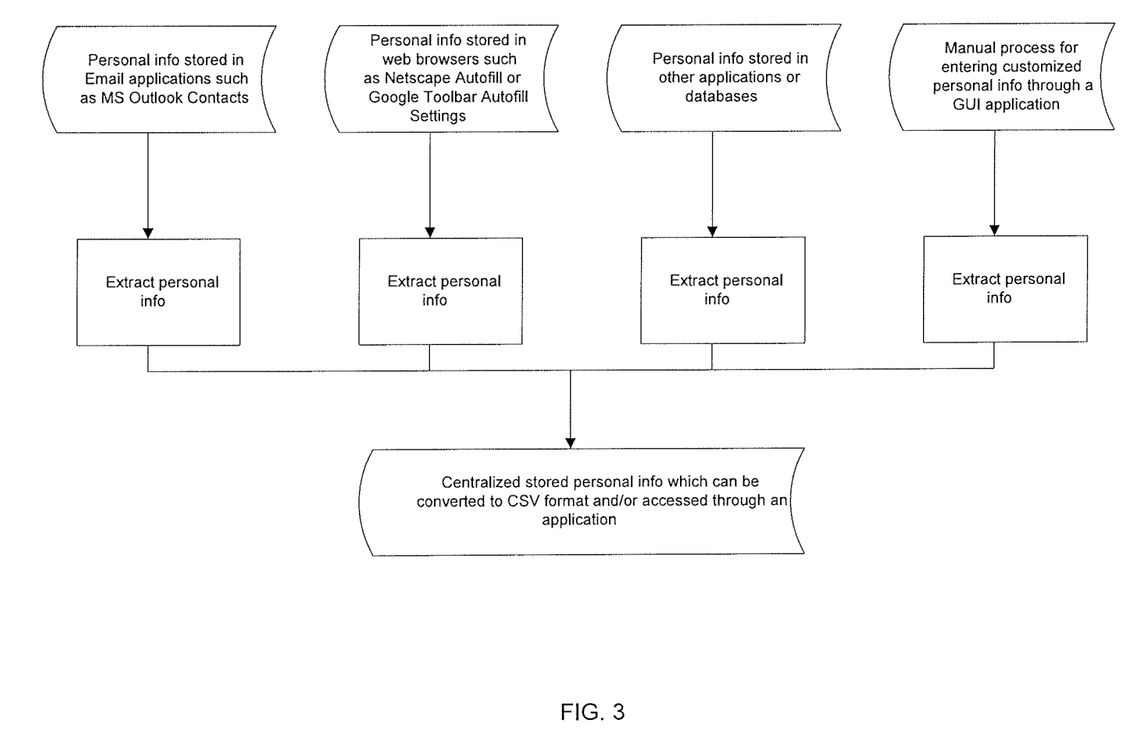
FIG. 3 is a block diagram illustrating an information-gathering process according to an embodiment of the invention.

Through the use of, for example, a graphical user interface (not shown) displayed on the display 250, the user may specify the types of information that should be sought and gathered. For example, as illustrated in FIG. 3, and by way of non-limiting example, the user may specify that a contacts database be accessed for retrieval of contact information, web browser files be accessed for retrieval of "autofill" information (e.g., name/address information, credit card information, passwords, etc.) used for web-based transactions and/or other information stored in a location that can be designated by a path and/or file name. An embodiment includes a graphical user interface that allows the user to pre-define and store in a location of the user's choosing a set of personal information that the user may desire to be accessed in the future. As such, the user may specify that such pre-defined information set be accessed for information retrieval.

Figure 4:
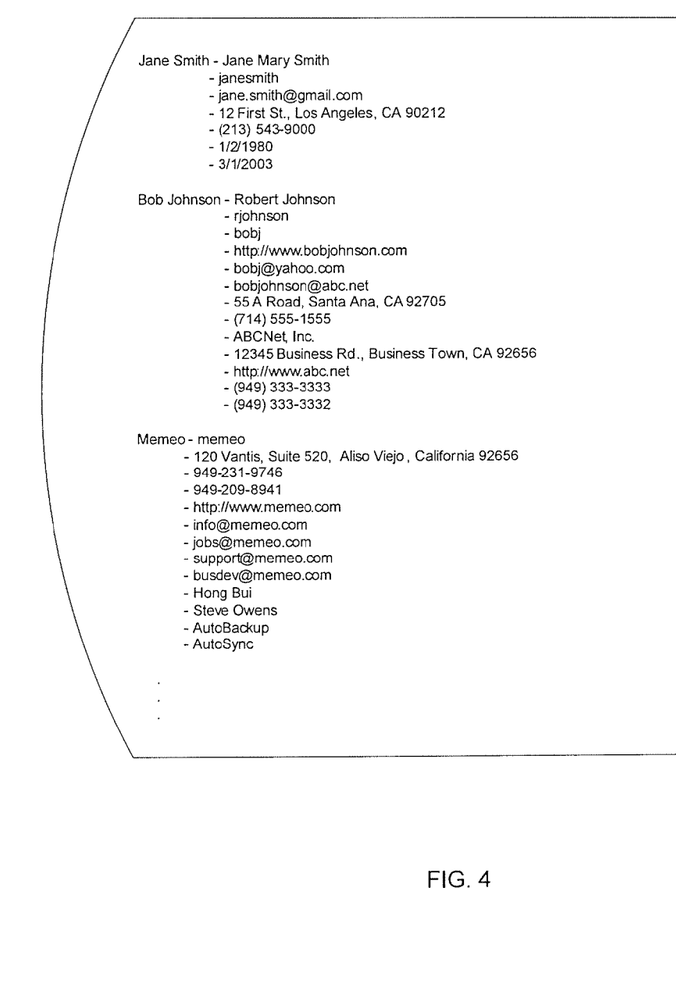
FIGS. 4 and 5 are diagrams illustrating storage formats of gathered information according to an embodiment of the invention.
Figure 5:
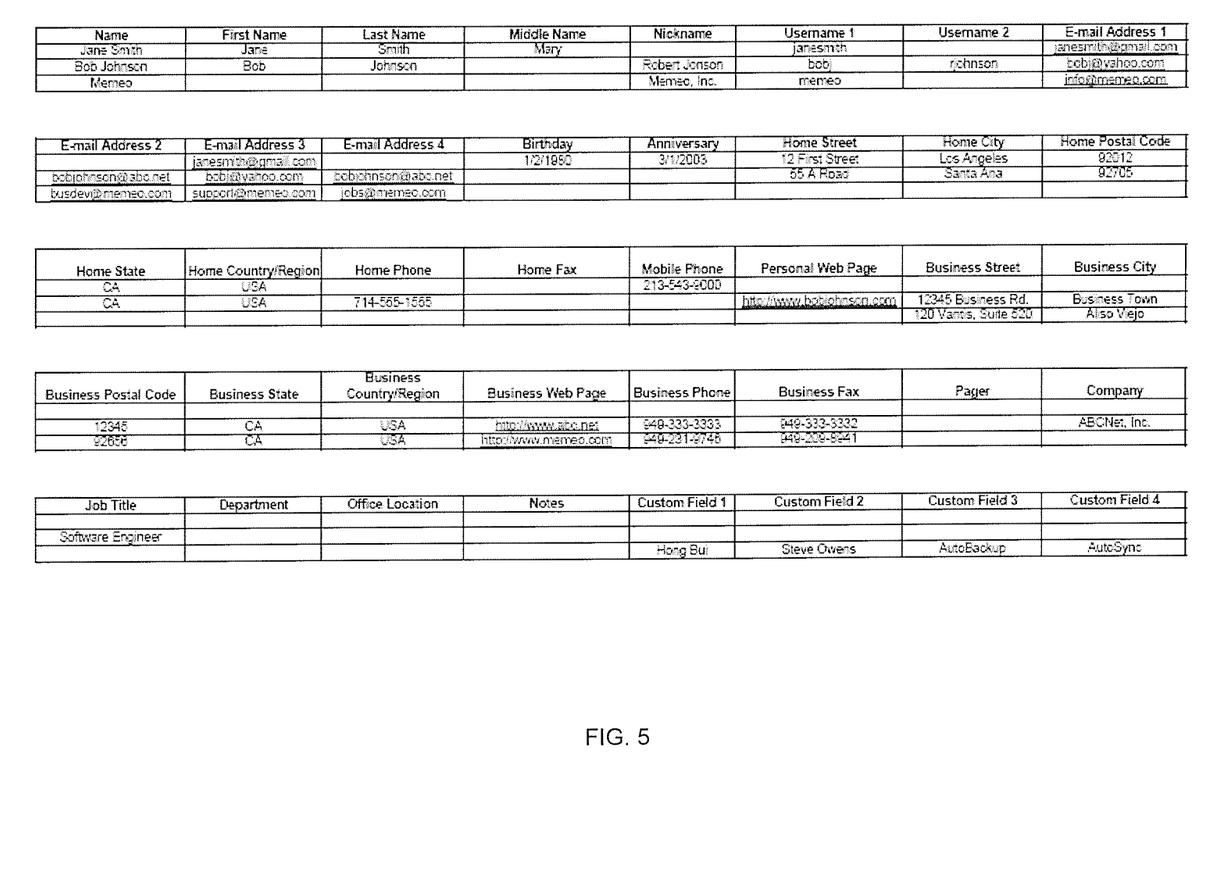

Referring to FIGS. 4 and 5, once the desired information is retrieved, it may be stored in a location (e.g., server 230, one or more of user devices 210, 280, or other location) of the user's choosing. The information can be converted to, for example, a .CSV format or accessed through a GUI application.

Once the desired personal information has been gathered, the application 215 and/or 235 can automatically search for digital data sets, such as folders, images, documents or other file types ("files"), in memory locations (e.g., memory devices associated with or otherwise coupled to server 230, one or more of user devices 210, 280, or other location) designated by the user. Using terms (e.g., business/personal names, passwords, email addresses, phone numbers, important dates, etc. discussed and illustrated with reference to FIGS. 4 and 5) associated with the gathered personal information as searchable keywords, the application 215 and/or 235 can automatically identify files stored in the memory locations that contain one or more of the keywords.

After identifying files with keywords, the application 215 and/or 235 can automatically act on each respective file based on a predetermined set of user preferences. For example, a user may have previously specified that all files that contain a certain term (be it in a body of text, associated metadata, file name, or the like) be moved or copied to a corresponding folder at a designated memory location associated with the network system 200. Additionally, a user may have previously specified that only files that contain a certain combination of terms be moved or copied to a corresponding folder at a designated memory location associated with the network system 200. Additionally, a user may have previously specified that all files that contain a certain date be moved or copied to a calendar application associated with the network system 200 so as to set up an event viewable in the calendar and associated with that date. Additionally, a user may have previously specified that all files that contain a certain term be emailed or otherwise forwarded to a designated recipient. In each such case, or combination thereof, the application 215 and/or 235 can automatically perform the desired predetermined act.

Additionally, the keyword-search and action functionality described above can be implemented as an ongoing process applied to newly created, modified and/or received files. For example, if a file is created that includes, or an existing file is modified to include, a particular keyword, then an embodiment, which can be configured to periodically poll stored files for keywords contained therein, can automatically subsequently perform an appropriate predetermined action on such file. Additionally, for example, if an email or other message is received that has associated therewith an attached file, an embodiment can automatically perform an appropriate predetermined action on such email attachment, such as moving the attachment to a particular folder based on automatic keyword search of the attachment.

In case of a potential or actual conflict between or among predetermined user-prescribed actions with respect to a file (e.g., the file contains multiple keywords that would precipitate two or more conflicting dispositions of the file), an embodiment can be configured to store copies of the file to all destinations associated with applicable actions. Alternatively, an embodiment can be configured to perform a single action with respect to the file based on a predetermined priority hierarchy, which may be established by the user. For example, the user may express, and an embodiment may give effect to, a desire that files containing a certain keyword be stored in a single location, regardless of any other keyword(s) that the file may contain.

Personal information can be organized by different keys, such as name, birthday, email address, etc.

As an illustration, keys can be names, email addresses, postal addresses, phone numbers that can be extracted from, for example, MS Outlook Contacts. Keywords, tags, author names can be extracted from the Properties info of a file such as Word document, JPEG image. These values are stored in a database organized with each field assigned to each extracted value.

The database as described above can be queried to return a set of values matching the specified search pattern. For example, from FIG. 5, a command to the database to return all names with a business state/location, the value of which is "CA" would return the names "Bob Johnson" and "Memeo."

Figure 6:
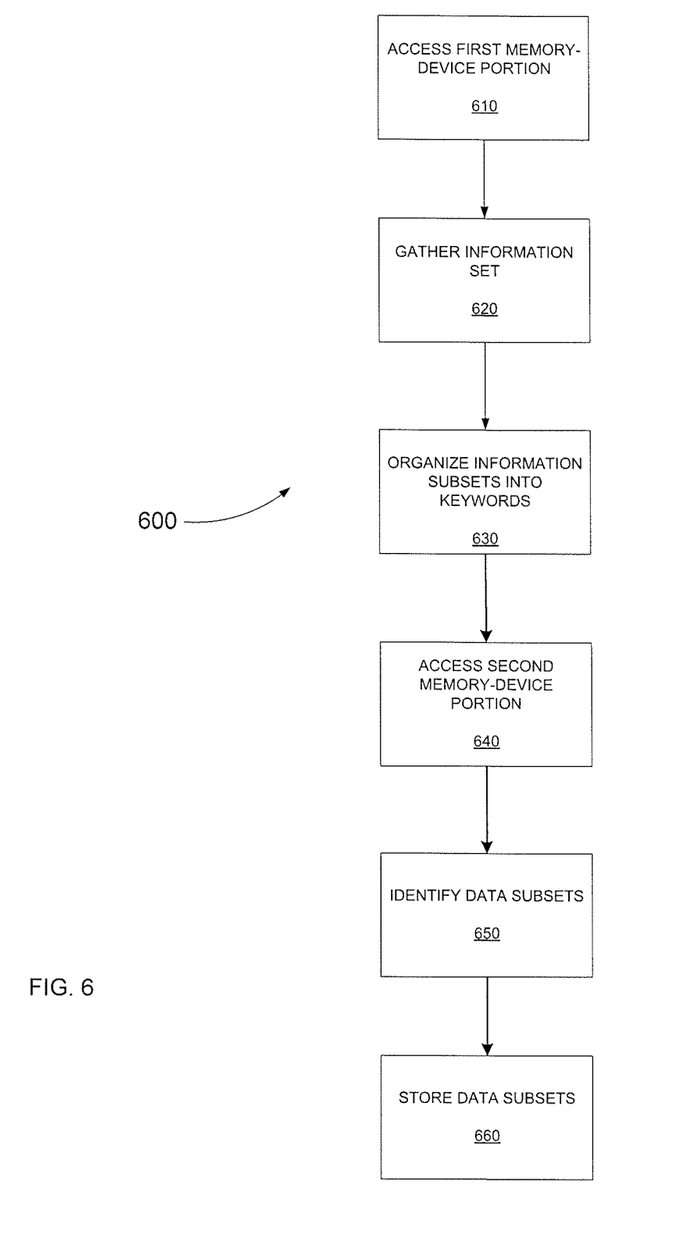
FIG. 6 is an illustration of a process according to an embodiment of the invention.

FIG. 6 illustrates a process 600 according to an embodiment of the invention. The process 600 is implementable in an electronic system coupled to or including a storage device and/or a network. The process 600 is illustrated as a set of operations shown as discrete blocks. The process 600 may be implemented in any suitable hardware, software, firmware, or combination thereof. The process 600 may be implemented in computer-readable instructions that can be sent from one electronic device to another over a network. The order in which the operations are described is not to be necessarily construed as a limitation.

At a block 610, a first portion of a memory device coupled to the network is accessed. The first portion has stored thereon information characterizing an entity. For example, a user of the user device 210 may instruct an application 215 executed by the user device 210 to access a memory portion of the user device 280 and, as discussed in greater detail below, gather therefrom personal information associated with, or other information pertaining to activities of, the user. Alternatively, the user of the user device 210 may instruct an application 215 executed by the user device 210 to access a memory portion of the user device 210 and gather therefrom personal information associated with, or other information pertaining to activities of, the user. Still alternatively, the user may instruct a web-based application 235 executed by the server 230 to perform one or more of the information-accessing and -gathering functions described above.

At a block 620, an information set of a predetermined information type is gathered from the first portion. For example, and by way of non-limiting example, the user may specify that a contacts database be accessed for retrieval of contact information, web browser files be accessed for retrieval of "autofill" information (e.g., name/address information, credit card information, passwords, etc.) used for web-based transactions and/or other information stored in a location that can be designated by a path and/or file name.

At a block 630, first and second information subsets of the information set are organized into first and second keywords.

At a block 640, a second portion of a memory device coupled to the network is accessed. The second portion has stored thereon a plurality of data sets. For example, once the desired personal information has been gathered, the application 215 and/or 235 can automatically search for digital data sets, such as folders, images, documents or other file types ("files"), in memory locations (e.g., memory devices associated with or otherwise coupled to server 230, one or more of user devices 210, 280, or other location) designated by the user.

At a block 650, a first subset of the data sets and a second subset of the data sets are identified. Each data set of the first data-set subset includes the first keyword, and each data set of the second data-set subset includes the second keyword. For example, using terms (e.g., business/personal names, passwords, email addresses, phone numbers, important dates, etc. discussed and illustrated with reference to FIGS. 4 and 5) associated with the gathered personal information as searchable keywords (e.g., first and second keywords), the application 215 and/or 235 can automatically identify files stored in the memory locations that contain one or more of the keywords.

At a block 660, the first data-set subset is stored in a third portion of a memory device coupled to the network, and the second data-set subset is stored in a fourth portion of a memory device coupled to the network. For example, after identifying files with keywords, the application 215 and/or 235 can automatically act on each respective file based on a predetermined set of user preferences. For example, a user may have previously specified that all files that contain a certain term (be it in a body of text, associated metadata, file name, or the like) be moved or copied to a corresponding folder at a designated memory location associated with the network system 200. Additionally, a user may have previously specified that only files that contain a certain combination of terms be moved or copied to a corresponding folder at a designated memory location associated with the network system 200. Additionally, a user may have previously specified that all files that contain a certain date be moved or copied to a calendar application associated with the network system 200 so as to set up an event viewable in the calendar and associated with that date. Additionally, a user may have previously specified that all files that contain a certain term be emailed or otherwise forwarded to a designated recipient. In each such case, or combination thereof, the application 215 and/or 235 can automatically perform the desired predetermined act.

While a preferred embodiment of the invention has been illustrated and described, as noted above, many changes can be made without departing from the spirit and scope of the invention. Instead, the invention should be determined entirely by reference to the claims that follow.

The embodiments of the invention in which an exclusive property or privilege is claimed are defined as follows:

1. A non-transitory computer-readable medium storing computer-executable instructions that, when executed in a system coupled to a network, enable the system to perform a method comprising:

accessing a first portion of at least one memory device of a plurality of memory devices coupled to the network, the first portion having stored thereon information characterizing an entity, wherein the plurality of memory devices includes memory devices associated with a plurality of user devices at different logical locations on the network;

gathering from the first portion an information set of a predetermined information type;

identifying first and second information subsets of the information set;

organizing the first and second information subsets of the information set into first and second keywords, wherein the gathering, identifying and organizing include generating the first and second keywords as searchable terms associated with the entity using the information of the first portion characterizing the entity;

accessing a second portion of the at least one memory device coupled to the network, the second portion having stored thereon a plurality of data sets;

identifying, using the first keyword, a first subset of the data sets, each data set of the first subset of the data sets including the first keyword, and, using the second keyword, a second subset of the data sets, each data set of the second subset of the data sets including the second keyword; and automatically determining a first operation and a second operation based on a set of user preferences, and performing the first operation on the first subset of the data sets and performing the second operation on the second subset of the data sets.

2. The medium of claim 1, wherein the predetermined information type is selected by a user of the system.

3. The medium of claim 1, comprising storing the first subset of the data sets in a third portion of the at least one memory device and the second subset of the data sets in a fourth portion of the at least one memory device, wherein the third and fourth portions of the at least one memory device are selected for storage of the first subset of the data sets and the second subset of the data sets by a user of the system.

4. The medium of claim 1, wherein the information set comprises contact information.

5. The medium of claim 1, wherein the information set comprises information used for web-based transactions.

6. The medium of claim 1, wherein the second portion of the at least one memory device is selected by a user of the system.

7. The medium of claim 1, comprising identifying a third information subset of the information set and organizing the third information subset of the information set into a third keyword, wherein each data set of the first subset of the data sets includes the third keyword.

8. The medium of claim 1, wherein the accessing the second portion of the at least one memory device is automatically performed periodically at a predetermined frequency.

9. A system, comprising:
a network interface configured to be coupled to a network; and
a processing device coupled to the network interface, the processing device configured to:
access a first portion of at least one memory device of a plurality of memory devices coupled to the network, the first portion having stored thereon information characterizing an entity, wherein the plurality of memory devices includes memory devices associated with a plurality of user devices at different logical locations on the network,
gather from the first portion an information set of a predetermined information type,
identify first and second information subsets of the information set;
organize the first and second information subsets of the information set into first and second keywords, wherein the gathering, identifying and organizing include generating the first and second keywords as searchable terms associated with the entity using the information of the first portion characterizing the entity,
access a second portion of the at least one memory device coupled to the network, the second portion having stored thereon a plurality of data sets,
identify, using the first keyword, a first subset of the data sets, each data set of the first subset of the data sets including the first keyword, and, using the second keyword, a second subset of the data sets, each data set of the second subset of the data sets including the second keyword, and
automatically determine a first operation and a second operation based on a set of user preferences, and perform the first operation on the first subset of the data sets and perform the second operation on the second subset of the data sets.

10. The system of claim 9, wherein the predetermined information type is selected by a user of the system.

11. The system of claim 9, wherein the first subset of the data sets is stored in a third portion of the at least one memory device coupled to the network and the second subset of the data sets is stored in a fourth portion of the at least one memory device coupled to the network, wherein the third and fourth portions of the at least one memory device are selected for storage of the first subset of the data sets and the second subset of the data sets by a user of the system.

12. The system of claim 9, wherein the information set comprises contact information.

13. The system of claim 9, wherein the information set comprises information used for web-based transactions.

14. The system of claim 9, wherein the second portion of the at least one memory device is selected by a user of the system.

15. The system of claim 9, wherein the processing device is configured to identify a third information subset of the information set and organize the third information subset of the information set into a third keyword, wherein each data set of the first subset of the data sets includes the third keyword.

16. The system of claim 9, wherein accessing the second portion of the at least one memory device is automatically performed periodically at a predetermined frequency.

* * * * *